Nov. 11, 1958
J. W. GRANT ET AL
2,859,971
PUZZLE RING
Filed March 18, 1955
4 Sheets-Sheet 1
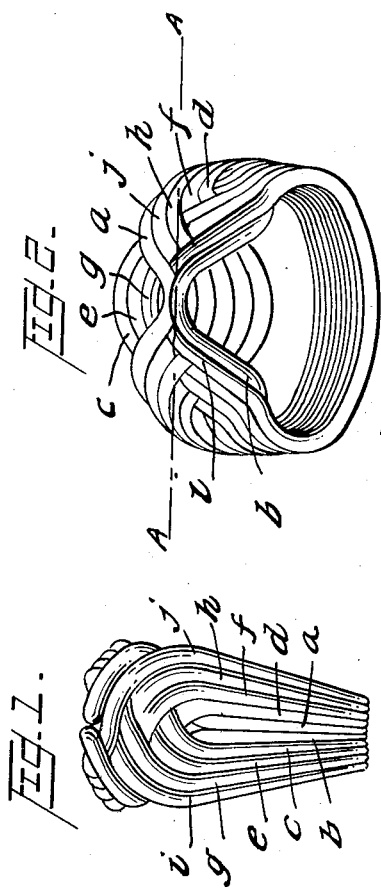
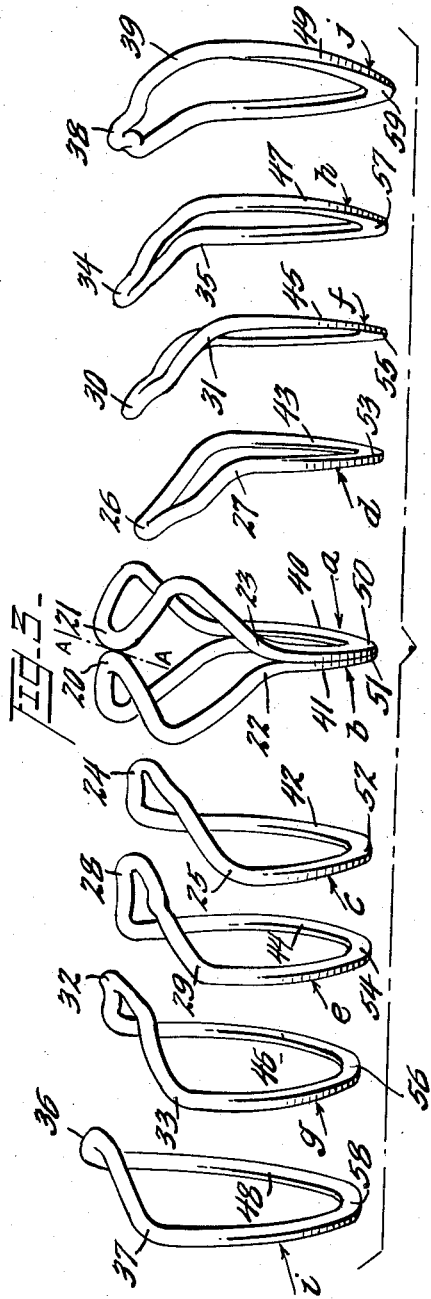
INVENTORS
Joseph W. Grant and Clarence P. Grant
BY Watson, Cole, Grindle & Watson
ATTORNEYS Nov. 11, 1958 J. W. GRANT ET AL 2,859,971
PUZZLE RING
Filed March 18, 1955 4 Sheets-Sheet 2
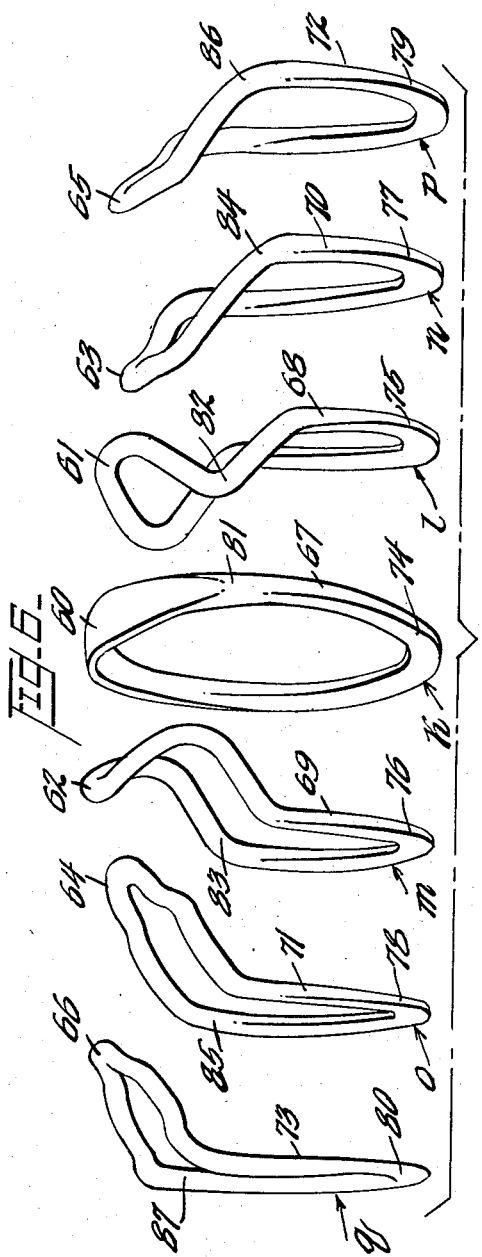
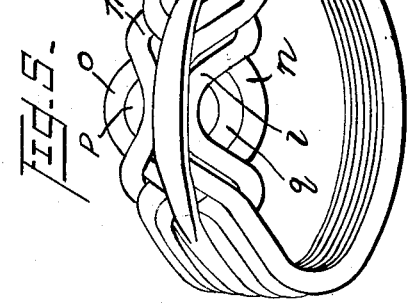
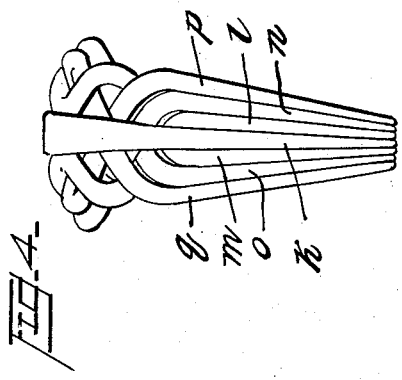
INVENTORS
Joseph W. Grant and Clarence P. Grant
BY Watson, Cole, Grindle & Watson,
ATTORNEYS Nov. 11, 1958 J. W. GRANT ET AL 2,859,971
PUZZLE RING
Filed March 18, 1955 4 Sheets-Sheet 3
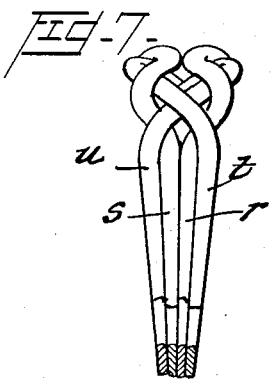
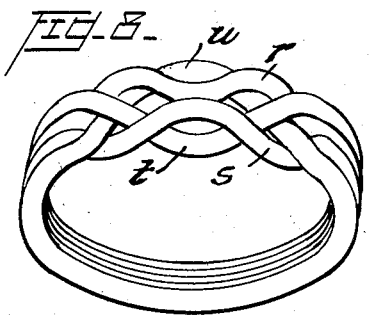
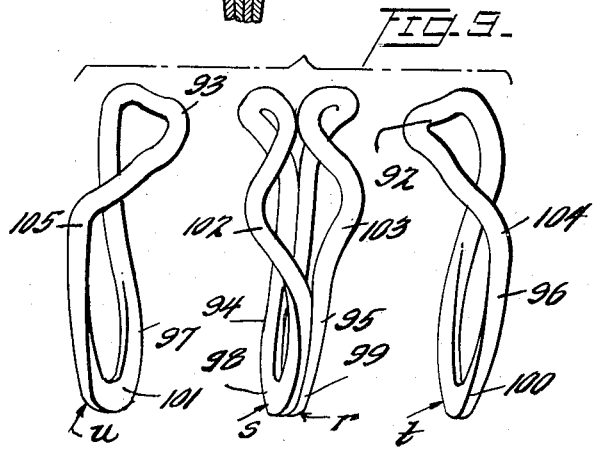
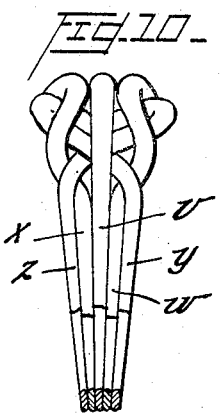
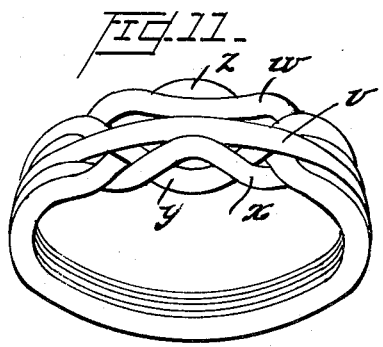
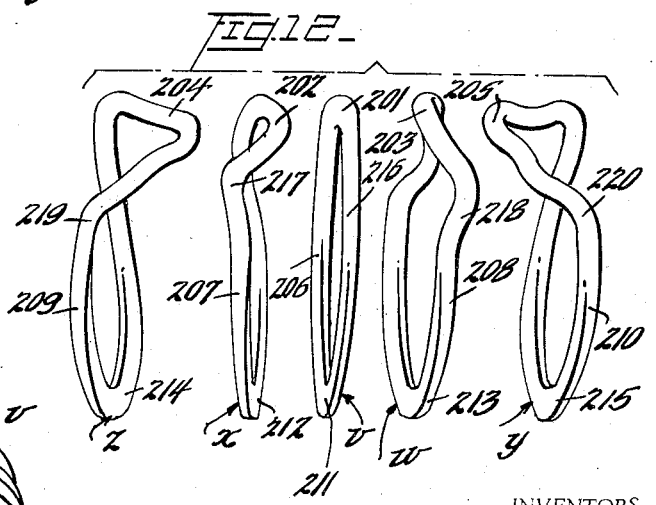
INVENTORS
Joseph W. Grant & Clarence P. Grant
BY Watson Cole, Grindle & Watson
ATTORNEYS Nov. 11, 1958
J. W. GRANT ET AL
2,859,971
PUZZLE RING
Filed March 18, 1955
4 Sheets-Sheet 4
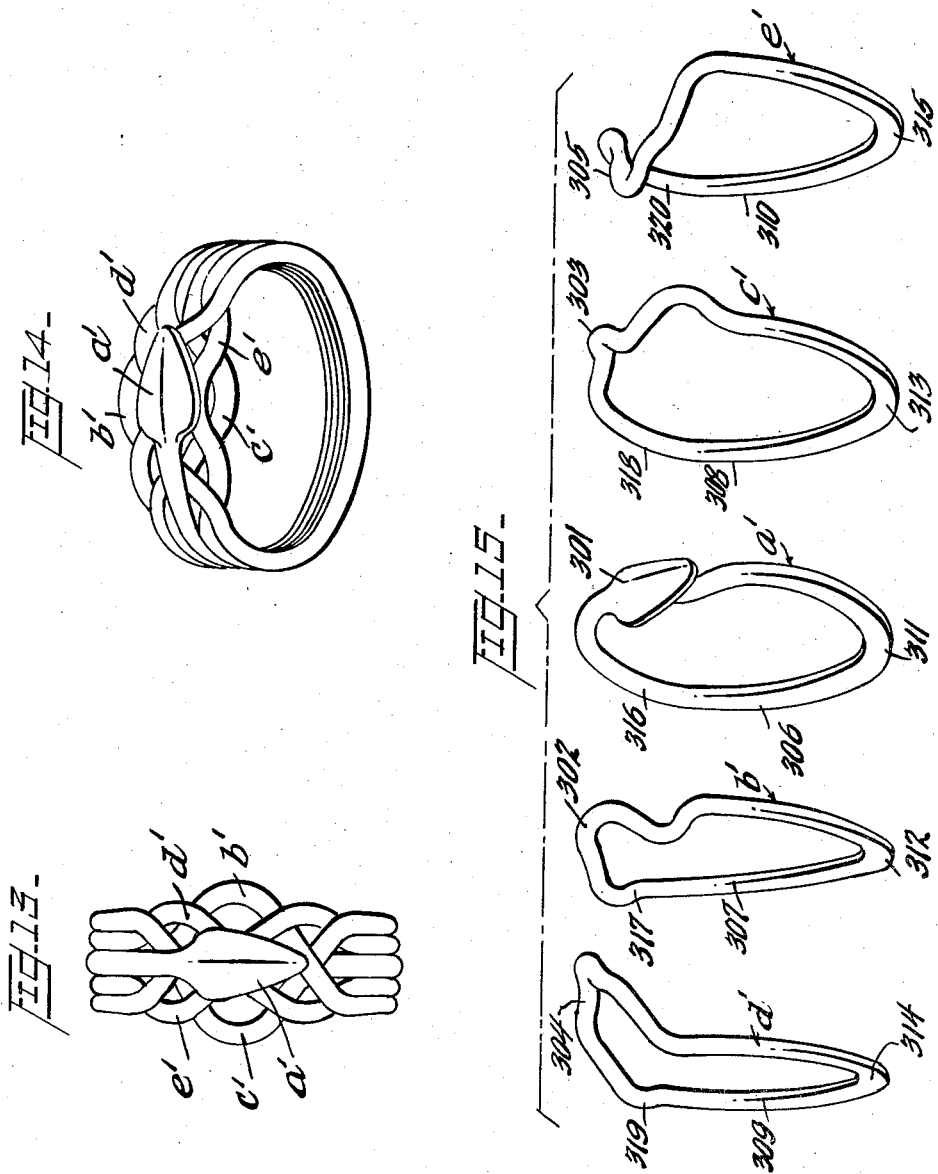
INVENTORS
Joseph W. Grant and Clarence P. Grant
BY Watson, Cole, Grindle & Watson
ATTORNEYS

United States Patent Office 2,859,971
Patented Nov. 11, 1958

2,859,971
PUZZLE RING

Joseph W. Grant, Lynnfield, Mass., and Clarence P. Grant, Oklawaha, Fla.

Application March 18, 1955, Serial No. 495,163

5 Claims. (Cl. 273—158)

This invention relates to puzzles which form composite finger rings when assembled. More specifically, this invention concerns composite finger rings comprising a plurality of independent ring elements or bands provided with interfitting design forming portions.

It is the object of this invention to provide composite finger rings employing a series of ring elements or bands which can be interwoven due, in part, to the arrangement of curves, channels and crimped portions in each ring element.

With the above and other objects in view, this invention consists of certain novel features of construction, combination, and arrangement of the parts of composite rings as will be hereinafter described and claimed.

In the accompanying drawings:

Figure 1 is a side view perspective of a fully assembled ring having ten separate ring elements or bands. This figure shows the smooth circular outline of the fully assembled ring;

Figure 2 is a front view perspective of this fully assembled ring showing the design of the crest;

Figure 3 shows the separate ring elements or bands together with their curves, channels, and crimped portions which form the ring of Figures 1 and 2 when united in the proper manner;

Figure 4 is a side perspective of a second embodiment of the composite ring having seven independent ring elements. This figure shows the smooth circular outline of the fully assembled ring;

Figure 5 is a front perspective of this fully assembled ring showing the crest and the relative position of each ring element in the completed ring;

Figure 6 shows the separate ring elements or bands together with their curves, channels, and crimped portions which form the ring shown in Figures 4 and 5 when united in the proper manner;

Figure 7 is a side view perspective of a fully assembled ring having four separate ring elements or bands. This figure shows the smooth circular outline of the fully assembled ring;

Figure 8 is a front perspective view of this four band composite ring showing the crest design in detail;

Figure 9 shows the separate ring elements or bands which form the assembled ring of Figures 7 and 8 when united in the proper manner;

Figure 10 is a side view perspective of a fully assembled composite ring consisting of five separate ring elements or bands;

Figure 11 is a front perspective of the assembled ring of Figure 10 and shows the crest design in detail;

Figure 12 shows the separate ring elements or bands which form the ring of Figures 10 and 11 when united in the proper manner;

Figure 13 is a front view of a fifth embodiment of the ring showing the crest. This embodiment is comprised of five separate ring elements or bands;

Figure 14 shows a front view perspective of the assembled puzzle ring comprising five independent ring elements or bands; and Figure 15 shows the five separate ring elements or bands which constitute the assembled ring of Figures 13 and 14 when assembled in the proper manner.

For purposes of description the areas of each ring element or band have been separately labeled in the drawings. Thus the portion of each ring element or band which is turned toward the palm of the wearer's hand when the assembled ring is worn will be referred to hereafter as the rear segment of the ring element or band. That portion of each ring element or band which ordinarily fits between the fingers when the assembled ring is worn will be hereafter referred to as the lateral segment of the ring element or band. That portion of each ring element which is ordinarily turned outward so that its decorative appearance may be viewed will be hereafter referred to as the frontal segment of the ring element or band. In the fully assembled ring the frontal segments of the ring elements or bands comprise the crest of the ring.

Figures 1, 2 and 3 show one embodiment of this composite ring comprising ten separate ring elements. This ring is assembled in the following manner:

Bands $a$ and $b$, hereafter referred to as the locking bands of the ring, are placed adjacent to one another so that the lateral segment 40 of locking band $a$ and the lateral segment 41 of locking band $b$, the rear segment 50 of locking band $a$ and rear segment 51 of locking band $b$, and the medial portion 21 of the inwardly curved, generally U-shaped frontal segment of locking band $a$ and the medial portion 20 of the similarly formed frontal segment of locking band $b$ respectively lie in mutual abutment as shown in Figure 3.

The medial portion 24 of the generally U-shaped frontal segment of band $c$ is placed under the medial portion 21 of the frontal segment of locking band $a$ so that the lateral portion 25 of the frontal segment of band $c$ lies over the lateral portion 22 of the frontal segment of locking band $b$. Band $c$ is now rotated until the lateral segment 42 of band $c$ and the rear segment 52 of band $c$ lie adjacent to and under the lateral segment 41 and rear segment 51 of locking band $b$.

The medial portion 26 of the generally U-shaped frontal segment of band $d$ is placed under the medial portion 20 of the frontal segment of locking band $b$ so that the lateral portion 27 of the frontal segment of band $d$ lies over the lateral portion 23 of the frontal segment of locking band $a$ and over the lateral portion 25 of the frontal segment of band $c$. Band $d$ is now rotated until the lateral segment 43 of band $d$ and the rear segment 53 of band $d$ lie adjacent to and above the lateral segment 40 and rear segment 50 of locking band $a$.

The medial portion 28 of the generally U-shaped frontal segment of band $e$ is placed under the medial portion 21 of the frontal segment of locking band $a$ so that the lateral portion 29 of the frontal segment of band $e$ lies over the lateral portion 22 of the frontal segment of locking band $b$ and over the lateral portion 27 of the frontal segment of band $d$. Band $e$ is now rotated until the lateral segment 44 of band $e$ and the rear segment 54 of band $e$ lie adjacent to and under the lateral segment 42 and rear segment 52 of band $c$.

The medial portion 30 of the generally U-shaped frontal segment of band $f$ is placed under the medial portion 20 of the frontal segment of locking band $b$ so that the lateral portion 31 of the frontal segment of band $f$ lies over the lateral portion 23 of the frontal segment of locking band $a$, over the lateral portion 25 of the frontal segment of band $c$, and over the lateral portion 29 of the frontal segment of band $e$. Band $f$ is now rotated until the lateral segment 45 of band *f* and the rear segment 55 of band *f* lie adjacent to and above the lateral segment 43 and rear segment 53 of band *d*.

The medial portion 32 of the generally U-shaped frontal segment of band *g* is placed under the medial portion 21 of the frontal segment of locking band *a* so that the lateral portion 33 of the frontal segment of band *g* lies over the lateral portion 22 of the frontal segment of locking band *b*, over the lateral portion 27 of the frontal segment of band *d*, and over the lateral portion 31 of the frontal segment of band *f*. Band *g* is now rotated until the lateral segment 46 of band *g* and the rear segment 56 of band *g* lie adjacent to and under the lateral segment 44 and rear segment 54 of band *e*.

The medial portion 34 of the generally U-shaped frontal segment of band *h* is placed under the medial portion 20 of the frontal segment of locking band *b* so that the lateral portion 35 of the frontal segment of band *h* lies over the lateral portion 23 of the frontal segment of locking band *a*, over the lateral portion 25 of the frontal segment of band *c*, over the lateral portion 29 of the frontal segment of band *e*, and over the lateral portion 33 of the frontal segment of band *g*. Band *h* is now rotated until the lateral segment 47 of band *h* and the rear segment 57 of band *h* lie adjacent to and above the lateral segment 45 and rear segment 55 of band *f*.

The medial portion 36 of the generally U-shaped frontal segment of band *i* is placed under the medial portion 21 of the frontal segment of locking band *a* so that the lateral portion 37 of the frontal segment of band *i* lies over the lateral portion 22 of the frontal segment of locking band *b*, over the lateral portion 27 of the frontal segment of band *d*, over the lateral portion 31 of the frontal segment of band *f*, and over the lateral portion 35 of the frontal segment of band *h*. Band *i* is now rotated until the lateral segment 48 of band *i* and the rear segment 58 of band *i* lie adjacent to and under the lateral segment 46 and rear segment 56 of band *g*.

The medial portion 38 of the generally U-shaped frontal segment of band *j* is placed under the medial portion 20 of the frontal segment of locking band *b* so that the lateral portion 39 of the frontal segment of band *i* lies over the lateral portion 23 of the frontal segment of band *a*, over the lateral portion 25 of the frontal segment of band *c*, over the lateral portion 29 of the frontal segment of band *e*, over the lateral portion 33 of the frontal segment of band *g*, and over the lateral portion 37 of the frontal segment of band *i*. Band *j* is now rotated until the lateral segment 49 of band *j* and the rear segment 59 of band *j* lie adjacent to and above the lateral segment 47 and rear segment 57 of band *h*.

It will be readily recognized that this composite ring is assembled by placing locking bands *a* and *b* in mutual abutment as shown in Figure 3 and then alternately inserting the generally U-shaped frontal segments of the remaining ring elements under the frontal segment of one and over the frontal segment of the other locking band. Each ring element is then rotated until its lateral and rear segments abut the lateral and rear segments of a band preceding it in the assembly of the ring. For example, in the ring shown in Figures 1, 2 and 3 the frontal segment of band *c* is placed under the frontal segment of band *a* and over the frontal segment of band *b* and rotated until its lateral and rear segments are in mutual abutment with the lateral and rear segments of band *b*. Alternately the frontal segment of band *d* is placed under the frontal segment of band *b* and over the frontal segment of band *a* and rotated until its lateral and rear segments are in mutual abutment with the lateral and rear segments of band *a*. By adding bands to first one and then the other side of the ring in this manner the assembly is completed.

The locking ring elements *a* and *b* function to prevent the separation of the remaining bands from the ring without the same relative angular movement necessary to assemble the ring. Such relative angular movement is, of course, impossible when the ring is on the wearer's finger. Every ring encompassed by this invention is provided with locking ring elements. In this highly unique manner unintentional dissassembly of the rings is prevented. In those composite rings having an even number of ring elements these locking ring elements lie in mutual abutment. In those composite rings having an odd number of ring elements, however, these locking ring elements are separated by a third ring element.

The relative angular movement necessary to disengage the locking ring elements is a rotating movement upon an axis lying in the crest of the ring. This axis may be defined as that line lying in the plane of the crest of the ring which bisects the crest. Considering the finger of the wearer as the axis of the ring this line can be defined more precisely as the intersection of a plane tangent to the crest of the ring and a second plane which is perpendicular to the first plane, perpendicular to the axis of the ring and which bisects the crest of the ring. In Figures 2 and 3 this line is designated at A—A and passes between the medial portions of the frontal faces of locking bands *a* and *b*. All description of relative angular movement in the assembly of each ring relates to this axis of rotation.

It will be readily apparent that all of these composite rings utilize the same principle of assembly although the number of ring elements and crest designs may vary substantially. In other words, all composite rings of the type encompassed by the present invention are comprised of separable ring elements which cannot be disengaged from the assembled ring without relative angular movement of the type described, every ring being provided with at least two locking ring elements which function to fixedly secure the remaining elements in the proper position.

Figures 4, 5 and 6 show an embodiment of this composite ring comprising seven independent bands. This ring is assembled as follows:

Bands *m* and *l* are the locking bands. The medial segment 69 and the rear segment 76 of locking band *m* are placed under and adjacent to the medial segment 68 and rear segment 75 of locking band *l* so that the lateral portion 83 of the frontal segment of locking band *m* lies over the lateral portion 82 of the frontal segment of locking band *l*.

The lateral segment 67 and rear segment 74 of band *k* are inserted between the lateral segment 69 and rear segment 76 of locking band *m* and the lateral segment 68 and rear segment 75 of locking band *l* so that the frontal segment 60 of band *k* lies between the medial portion 62 of the frontal segment of locking band *m* and the medial portion 61 of the frontal segment of locking band *l*.

The lateral segment 71 and rear segment 78 of band *o* are inserted between the lateral segment 69 and the rear segment 76 of locking band *m* and the lateral segment 67 and rear segment 74 of band *k* so that the lateral portion 85 of the frontal segment of band *o* extends under the lateral portion 82 of the frontal segment of locking band *l* and under lateral portion 83 of the frontal segment of locking band *m*. In this way the medial portion 64 of the frontal segment of band *o* lies adjacent to the medial portion 60 of the frontal segment of band *k*.

The lateral segment 70 and rear segment 77 of band *n* are placed between the lateral segment 68 and rear segment 75 of locking band *l* and the lateral segment 67 and rear segment 74 of band *k* so that the lateral portion 84 of the frontal segment of band *n* extends under the lateral portion 82 of the frontal segment of locking band *l* and over the lateral portion 83 of the frontal segment of locking band *m*. In this way the medial portion 63 of the frontal segment of band n lies adjacent to the medial portion 60 of the frontal segment of band k.

The medial portion 65 of the frontal segment of band p is placed under the medial portion 62 of the frontal segment of locking band m so that the lateral portion 86 of the frontal segment of band p lies over the lateral portion 82 of the frontal segment of locking band l and the lateral portion 85 of the frontal face of band o. Band p is then rotated until the lateral segment 72 and rear segment 79 of band p lie adjacent to the lateral segment 69 and rear segment 76 of locking band m.

The medial portion 66 of the frontal segment of band q is placed under the medial portion 61 of the frontal segment of locking band l so that the lateral portion 87 of the frontal segment of band q lies over the lateral portion 83 of the frontal segment of locking band m, over the lateral portion 84 of the frontal segment of band n, and over the lateral portion 86 of the frontal segment of band p. Band q is then rotated until the lateral segment 73 and rear segment 80 of band q lie adjacent to the lateral segment 68 and rear segment 75 of locking band l.

Figures 7, 8 and 9 illustrate an embodiment of this composite ring comprising four separable bands. This embodiment is assembled as follows:

Bands r and s, the locking bands of the ring, are placed adjacent so that the lateral segment 94 of locking band s and the lateral segment 95 of locking band r, the rear segment 98 of locking band s and the rear segment 99 of locking band r, and the medial portion of the frontal segment of locking bands r and s, lie in mutual abutment as shown in Figure 9.

The medial portion 93 of the frontal segment of band u is placed under the medial portion of the frontal segment of locking band n so that the lateral portion 105 of the frontal segment of band u lies over the lateral portion 102 of the frontal segment of locking band s. Band u is now rotated until the lateral segment 97 of band u and the rear segment 101 of band u lie adjacent to and under the lateral segment 94 and rear segment 95 of locking band s.

The medial portion 92 of the frontal segment of band t is placed under the medial portion of the frontal segment of locking band s so that the lateral portion 104 of the frontal segment of band t lies over the lateral portion 103 of the frontal segment of locking band r. Band t is now rotated until the lateral segment 96 of band t and the rear segment 100 of band t lies adjacent to and above the lateral segment 95 and rear segment 99 of locking band r.

Figures 10, 11 and 12 illustrate an embodiment of this composite ring comprising five separable ring elements. This embodiment is assembled as follows:

Bands x and w are the locking bands. The lateral segment 207 and rear segment 212 of locking band x are placed in mutual abutment with the lateral segment 208 and the rear segment 213 of locking band w so that the medial portion 202 of the frontal segment of locking band x lies adjacent to the medial portion 203 of the frontal segment of locking band w.

Band v is slid between bands x and y so that the medial segment 201 of band v lies between the medial portion 202 of the frontal segment of locking band x and the medial portion 203 of the frontal segment of locking band w.

The medial portion 204 of the frontal segment of frontal segment of locking band w so that the lateral band z is placed under the medial portion 203 of the portion 219 of the frontal segment of band z lies over the lateral portion 217 of the frontal segment of locking band x. Band z is now rotated until the lateral segment 209 and rear segment 214 of band z lie adjacent to the lateral segment 207 and rear segment 212 of locking band x.

The medial portion 205 of the frontal segment of band y is placed under the medial portion 202 of the frontal segment of locking band x so that the lateral portion 220 of the frontal segment of band y lies over the lateral portion 218 of the frontal segment of locking band w. Band y is now rotated until the lateral segment 210 and rear segment 215 of band y lie adjacent to the lateral segment 208 and rear segment 213 of locking band w.

Figures 13, 14 and 15 show another embodiment of this composite ring comprising five individual bands. This embodiment may be assembled as follows:

Bands b' and c' are the locking bands. The medial segment 307 and the rear segment 312 of locking band b' are placed over and adjacent to the medial segment 308 and rear segment 313 of locking band c' so that the lateral portion 317 of the frontal segment of locking band b' extends under the lateral portion 318 of the frontal segment of locking band c'.

Band a' is slid between locking bands b' and c' so that the medial portion 301 of the frontal segment of band a' lies between the medial portion 302 of the frontal segment of locking band b' and the medial portion 303 of the frontal segment of locking band c'.

Band d' is inserted between locking band b' and band a' so that the lateral portion 319 of the frontal segment of band d' lies over the lateral portion 318 of the frontal segment of locking band c'. Band d' is now rotated until the medial segment 309 and rear segment 314 of band d' lie between the medial segment 307 and rear segment 312 of locking band b' and the medial segment 306 and rear segment 311 of band a'.

Band e' is inserted between locking band c' and band a' so that the lateral portion 320 of the frontal segment of band e' lies over the lateral portion 317 of the frontal segment of locking band b'. Band e' is now rotated until the medial segment 310 and rear segment 315 of band e' lie between the medial segment 308 and rear segment 312 of locking band c' and the medial segment 306 and rear segment 311 of band a'.

The ring elements of these composite rings are composed preferably of wire, each loop being made from a straight strip or piece of metal bent and soldered or otherwise fastened. Silver or gold wire may be used.

Each element is so constructed that the crimped portions of each band element is received by the offset recess of the adjacent band elements. In this way all the various elements of the ring become perfectly aligned so that the finger receiving space is smooth and the ring fits the finger snugly maintaining its composite form. It is, of course, possible to utilize a greater number of separable ring elements in constructing this composite ring than have been described. The complexity of the ring increases with the number of ring elements used.

Possible changes in the form, proportion and minor details of construction may be made without departing from the spirit of this invention.

Having thus described the invention, what is claimed by Letters Patent is:

1. As an article of manufacture, a composite finger ring comprising a plurality of inter-associated, separate ring elements adapted to be assembled in close engagement and in interlocking relation whereby said elements cannot disengage each other without relative angular movement about an axis, said axis being the line of intersection between a plane tangent to the crest of said ring and a second plane perpendicular to said first plane, perpendicular to the axis of said ring, and bisecting said crest of said ring, at least two of said ring elements acting as locking means for the remaining elements and having opposed, inwardly curved generally U-shaped upper frontal segments, the medial portions of said U-shaped portions lying closely adjacent when the ring is assembled, and at least two other ring elements having opposed, inwardly curved generally U-shaped frontal segments, each extending over the frontal segment of one of said first two elements and under the frontal segment of the other of said first two segments.

2. As an article of manufacture, a composite finger ring comprising ten inter-associated, separate ring elements adapted to be assembled in close engagement and in interlocking relation whereby said elements cannot disengage each other without relative angular movement about an axis, said axis being the line of intersection between a plane tangent to the crest of said ring and a second plane perpendicular to said first plane, perpendicular to the axis of said ring, and bisecting said crest of said ring, at least two of said ring elements acting as locking means for the remaining elements and having opposed, inwardly curved generally U-shaped frontal segments, the medial portions of said U-shaped portions lying closely adjacent when the ring is assembled, the remaining eight ring elements having opposed, inwardly curved generally U-shaped frontal segments, each extending over the front segment of one of said first two elements and under the frontal segment of the other of said first two elements.

3. As an article of manufacture, a composite finger ring comprising seven inter-associated, separate ring elements adapted to be assembled in close engagement and in interlocking relation whereby said elements cannot disengage each other without relative angular movement about an axis, said axis being the line of intersection between a plane tangent to the crest of said ring and a second plane perpendicular to said first plane, perpendicular to the axis of said ring, and bisecting said crest of said ring, at least two of said ring elements acting as locking means for the remaining elements and having opposed, inwardly curved generally U-shaped frontal segments, the medial portions of said U-shaped portions separated by the medial portion of the frontal segment of the third ring element, the remaining four ring elements having opposed, inwardly curved generally U-shaped frontal segments, each extending over the frontal segment of one of said first two elements and under the frontal segment of the other of said first two segments.

4. As an article of manufacture, a composite finger ring comprising four inter-associated, separate ring elements adapted to be assembled in close engagement and in interlocking relation whereby said elements cannot disengage each other without relative angular movement about an axis, said axis being the line of intersection between a plane tangent to the crest of said ring and a second plane perpendicular to said first plane, perpendicular to the axis of said ring, and bisecting said crest of said ring, at least two of said ring elements acting as locking means for the remaining elements and having opposed, inwardly curved generally U-shaped frontal segments, the medial portions of said U-shaped portions lying closely adjacent when the ring is assembled, the remaining two ring elements having opposed, inwardly curved generally U-shaped frontal segments, each extending over the frontal segment of one of said first two elements and under the frontal segment of the other of said first two segments.

5. As an article of manufacture, a composite finger ring comprising five inter-associated, separate ring elements adapted to be assembled in close engagement and in interlocking relation whereby said elements cannot disengage each other without relative angular movement about an axis, said axis being the line of intersection between a plane tangent to the crest of said ring and a second plane perpendicular to said first plane, perpendicular to the axis of said ring, and bisecting said crest of said ring, two of said ring elements acting as locking means for the remaining elements and having opposed, inwardly curved generally U-shaped frontal segments, the medial portions of said U-shaped portions separated by the medial portion of the frontal segment of the third ring element, the remaining two ring elements having opposed, inwardly curved generally U-shaped frontal segments, each extending over the frontal segment of one of said first two elements and under the frontal segment of the other of said first two segments.

References Cited in the file of this patent

UNITED STATES PATENTS

| Number | Name | Date |
|---|---|---|
| 367,896 | Davidson | Aug. 9, 1887 |
| 448,892 | Staiger | Mar. 24, 1891 |
| 549,674 | Lederer | Nov. 12, 1895 |
| 1,095,908 | Messenger | May 5, 1914 |
| 1,338,973 | Brown | May 4, 1920 |
| 2,016,679 | Mayer | Oct. 8, 1935 |
| 2,151,607 | Lovell | Mar. 21, 1939 |
| 2,177,314 | Dachenhausen | Oct. 24, 1939 |